United States Patent Office 3,577,489
Patented May 4, 1971

3,577,489
METHOD FOR AGGLOMERATING SUSPENDED PARTICLES
Christian Rosenthal, Munich, Germany, assignor to Chemische Werke Munich Otto Barlocher G.m.b.H., Munich, Germany
No Drawing. Continuation-in-part of application Ser. No. 649,088, June 26, 1967. This application Apr. 26, 1968, Ser. No. 725,271
Claims priority, application Germany, June 28, 1966, C 39,466; July 1, 1966, C 39,506; Sept. 16, 1966, C 40,148; Mar. 9, 1967, C 41,719; Apr. 28, 1967, C 42,182
Int. Cl. B01j 2/10
U.S. Cl. 264—117
13 Claims

ABSTRACT OF THE DISCLOSURE

A plurality of finely subdivided solid particles is converted into a mass of distinct agglomerated bodies by suspending the solid subdivided particles in water heated to at least 80° C. The particles must be such that water is inert thereto and which are at most slightly soluble in water. The granulating agent is a synthetic organic plastic which is dissolved in a liquid organic solvent at at least 80° C. The granulating solution is then added to the suspension and the thus-formed mixture is maintained, preferably under stirring, at an elevated temperature below 100° C. and sufficiently high to form granules of the finely subdivided particles and the granulating agent so that a plurality of agglomerated bodies each comprising a plurality of the finely subdivided particles adhered to each other by the granulating agent will be obtained.

CROSS-REFERENCES TO RELATED APPLICATIONS

The present application is a continuation-in-part of my co-pending application Ser. No. 649,088, filed June 26, 1967 and entitled "Method of Agglomerating Pulverulent Materials," the contents of which are incorporated herein by reference.

BACKGROUND OF THE INVENTION

My above-mentioned co-pending patent application discloses a method of granulating chemical substances which are only difficultly soluble or insoluble in water, tend to form dust, and form a dispersion in water, such as metal salts, particularly metal soaps and pigments wherein the substances are agglomerated from their suspension in an aqueous medium at temperatures above about 60° C., in the presence of compounds which are difficultly soluble or insoluble in water and have a molecular weight of above 150, preferably above 200, and a softening point of below 100° C., and the granulate is isolated and dried. The granulating aids or agents frequently have a longer chain aliphatic residue.

In this connection fatty alcohol esters, fatty acid esters of polyhydric alcohols, alkyd esters, ester waxes, fatty acid amides, and fatty acid alkylolamides, fatty acid nitriles, alkyl phenols, fatty ketones, mixtures of mineral oils and liquid paraffins with metal soaps, fatty acid anhydrides, and mixtures containing mineral oils or liquid paraffins and having a softening point of below 100° C., have in particular given good results as granulating aids. Fatty alcohol ethers may also be used as granulating aids.

Among the fatty acid esters of polyhydric alcohols, alkylene glycol esters, including polyalkylene glycol esters, in which the alkylene residue is generally ethylene, are particularly suitable. An advantage of the method consists in the use of those esters which impart particular properties, such as for example greater stability, to the end product.

A simple form of execution of the method comprises adding the granulating agent, used for agglomerating the substances, to an aqueous suspension of the substances at a temperature above 60° C. and with stirring. In some cases it may also be advantageous for the heating to be effected only after the granulating agent has been added.

The granulating agents are generally used in amounts of from 3 to 25 weight percent, preferably from 10 to 20 weight percent, based on the substance to be granulated.

This method is also useful for the granulation of polymers containing halogens in which case preferably substances which are suitable as lubricants in the processing of plastics, particularly polyvinyl chloride, are used as granulating agents.

It is also disclosed in my above-mentioned copending application to use metal soaps, particularly ricinoleates or octoates as granulating agents. The granulating agents may be added, with stirring, in the form of an aqueous distribution—emulsion, dispersion, or suspension, to the materials to be granulated, which may also be in the form of distribution in an aqueous liquid.

Furthermore, it has been found that the granulation according to the method disclosed in the above-mentioned application may be carried out more quickly and at lower temperature if, in addition to the granulating agents discussed above, organic, water-insoluble solvents are also present during granulation.

Chemical substances which are difficultly soluble or insoluble in water but can form a dispersion therein and which substances tend to form dust, thus may be granulated with the aid of suitable organic granulating agents which contain a hydrocarbon residue and the melting point of which is above 40° C., together with organic, water-insoluble solvents having boiling points up to 135° C. or with those solvents which are volatile with water vapors, i.e. are steam-distillable, by suspending the substance to be granulated, the granulating agents, and the solvents in water, and heating the mixture with stirring until a granulate has formed, then filtering off the granules, optionally followed by washing and drying.

The solvents may be, for example, water-insoluble aromatic, aliphatic, or chlorinated hydrocarbons, alcohols, ethers, esters, and ketones having boiling points up to 135° C. but preferably below 100° C., as well as solvents having higher boiling points which however are steam-distillable. More specifically, suitable solvents are, for example, aliphatic benzenes having boiling points from 80 to 100° C., methylene chloride, trichloroethylene, carbon tetrachloride, benzene, toluene, xylene, cyclohexanol, cyclohexanone, and nitrobenzene.

This method provides a number of advantages such as that granulation may be carried out at lower temperatures. The lowest temperature required is no longer 60° C. but only about 40° C. The granulation time is reduced, on the average, by half if such solvents are added.

The formed granules are more uniform and normally range between 0.1 and 1 mm. in diameter. With higher proportions of solvent it is also possible to obtain granules having diameter of 5 mm. or more. Conversely, the diameter of the granules may be reduced by increasing the speed of stirring.

This method may be successfully employed for granulating synthetic resins, such as polyalkylenes, for example polyethylene, but in particular for granulating polyvinyl chloride and its copolymers.

In addition, it has been found that it is possible to granulate polymers, particularly polyvinyl halides, simply by adding plasticisers and/or solvents.

The granulating of polymers containing halogen is also disclosed which is characterized by the dissolution of part of the polymers at elevated temperature in plasticisers and/or solvents, while the remainder of the polymers is suspended in water at low temperature. The solution of polymers is stirred into the aqueous suspension and the mixture thereupon heated slowly until granulation has taken place. Stirring is then stopped, water is added again, and the product heated for a short time to a temperature of 80 to 100° C. If, additionally, solvents are also used, they are evaporated together with the water.

All conventional plasticizers may be used, particularly phthalate plasticizers, and in addition sebacic acid esters, adipic acid esters, phosphate plasticizers, and, last but not least, polymer plasticizers.

The solvents used preferably are those having boiling points between 30 and 200° C., most preferably from 60 to 110° C., and also those solvents which are steam-distillable. The following may be mentioned: aromatic hydrocarbons, preferably benzene, toluene, xylene, aliphatic hydrocarbons, esters, such as butyl acetate, ketones, such as cyclohexanone, ethers, such as dibutyl ether, and also mixtures of solvents, such as for example mixtures of toluene and acetone. Chlorinated hydrocarbons, such as carbon tetrachloride, give good results in the granulation of emulsion polyvinyl chloride.

Suspension and emulsion polyvinyl chlorides of all customary K-values and also suspension and emulsion polyvinyl chloride mixtures and optionally also copolymers containing halogen-containing polymers can be granulated. In particular the last-described method may also be used for effecting granulation from the suspension or emulsion.

This is particularly advantageous for the granulation of emulsion polyvinyl chloride, because the emulsifiers, which are frequently disturbing in the subsequent processing, are for the most part washed out during the granulation.

It is thus possible to produce hard PVC granules and soft PVC granules with any desired plasticizer content.

The amounts of plasticizer are between 10 and 100 parts to 100 parts of resin, but preferably between 30 and 80 parts per 100 parts of resin are used. The amount of plasticizer which is desired in the finished soft granules is of course used for granulation. With proportions of 80 to 30 parts of plasticizer to 100 parts of PVC which are customary in practice, granulation may be successfully effected with the aid of plasticizers alone without the aid of solvents. In the case of smaller amounts of plasticizer, increasing amounts of solvent should be added for the granulation.

In the case of the granulation of hard PVC, use is made of from 10 to over 400 parts of solvent for each 100 parts of polyvinyl chloride, but preferably from 100 to 200 parts by weight of solvent are used.

If desired, it is also possible for additives, such as stabilizers or lubricants, to be simultaneously granulated. The last-described method thus makes it possible to supply the processor with finished free-flowing granules of the optimum composition for varying processing conditions, in the form of granules including all additives, such as plasticizers, stabilizers, fillers, antistatic agents, antiflame agents, coloring agents, etc.

For carrying out this method, a small proportion of the polyvinyl chloride, preferably from 1 to 3%, is dissolved at elevated temperature between 35 and 200° C. in the entire plasticizer or plasticizer-solvent mixture. The remaining major part of the resin is suspended separately in water at room temperature, preferably in from 1 to 2 times the amount of water relative to resin. Thereupon, heating is effected, upon stirring of the combined solution and suspension, until granulation occurs, which is generally the case between 40 and 60° C. Stirring is then stopped and granules in liquid heated to 80–100° C. When working without solvent, the finished granules may be separated after a short heating time, namely after only 5 to 15 minutes. When granulating with solvents, the solvent is advantageously evaporated together with the water and recovered. Heating periods are then correspondingly longer.

Finally, my co-pending application describes the granulating of halogen-containing polymers with solvents and/or plasticizers without previously dissolving a part of the polymer in the plasticizer and/or solvents.

Halogen-containing polymers may be granulated by diluting a suspension or emulsion of the polymeric resins with water, adding solvent and/or plasticizer while stirring, continuing stirring of the mixture until flocculation occurs, and further stirring at room temperature or with slight heating to about 40° C. until a granulate is formed.

For the purpose of granulating emulsion polyvinyl chloride in particular, the latter is mixed, before adding the solvents and/or plasticizers, with from 0.1 to 2%, preferably 0.25 to 1.25%, based on the amount of resin, of a salt from the group of alkaline earths, aluminum, or heavy metals, calculated as fixed salt, in the form of an aqueous solution.

The solvents used for granulating an emulsion-PVC by this method are preferably those which swell with emulsion polyvinyl chloride or which gelatinize the emulsion polyvinyl chloride, for example aromatic hydrocarbons, such as benzene, toluene, xylene, or chlorinated hydrocarbons, such as carbon tetrachloride.

However, non-gelatinizing solvents are also suitable for granulating emulsion polyvinyl chloride, for example esters, such as butyl acetate, ketones, such as cyclohexanone, ethers, such as dibutyl ether, alcohols, such as n-butanol, or aliphatic hydrocarbons, such as petroleum ether. Mixtures of the solvents mentioned may also be used.

For the granulation of emulsion polyvinyl chloride containing no plasticizers, use is made of from 10 to over 400 parts of solvent to 100 parts of polyvinyl chloride, but preferably 100 to 200 parts (all parts by weight). The granulating temperatures applied necessarily must be below the boiling point of water and above the boiling point of the solvent used.

All customary plasticizers are suitable as plasticizers for emulsion polyvinyl chloride granules containing plasticizer, particularly phthalate plasticizers but also sebacic acid esters, adipic acid esters, phosphate plasticizers, polymer plasticizers, or esters of fatty acids and alcohols with 4–22, preferably 4–8 carbon atoms. Chlorinated paraffins, either alone or together with other plasticizers, are also suitable for this purpose. The quantities of plasticizer may be selected as desired and generally will be between 10 and 100 parts per 100 parts of resin, preferably from 30 to 80 parts.

The plasticizers may be used alone or together with the solvents for granulating emulsion polyvinyl chloride.

This method is therefore of particular importance for granulating polyvinyl chloride free from plasticizer, in cases where previous dissolution in the plasticizer is not possible.

Practically only those solvents which gelatinize polyvinyl chloride, for example toluene, are suitable for granulating suspension polyvinyl chloride which is free of plasticizer. The granulation of suspension polyvinyl chloride containing a plasticizer, is preferably effected by the above-described method, according to which a part of the polymer containing halogen is previously dissolved in the solvent and/or plasticizer.

It has already been pointed out in my co-pending application referred to above that the method may also be applied to plastics such as polyolefins, for example polyethylene, polyacrylic compounds, or copolymers, and not solely to polymers containing halogen.

SUMMARY OF THE INVENTION

The present invention proposes a method of converting a plurality of finely subdivided solid particles into a mass of distinct agglomerated bodies, comprising the steps of suspending the solid subdivided particles in water heated to at least 80° C., the particles being of a nature to which water is inert and which are at most slightly soluble in water, separately dissolving a granulating agent consisting of a synthetic organic plastic in a liquid organic solvent at at least 80° C. and then adding the granulating solution to the suspension whereupon the thus-formed mixture is maintained, preferably under stirring, at an elevated temperature below 100° C. and sufficiently high to from granules of the finely subdivided particles and the granulating agent so that a plurality of agglomerate bodies each comprising a plurality of the finely subdivided particles adhered to each other by the granulating agent will be obtained.

The plurality of agglomerated bodies which is thus-obtained may then be separated from the liquid. The liquid generally will be water. The monomeric material referred to above may be lithium stearate preferably dissolved in dioctyl phthalate or a solution in mineral oil of calcium, barium or aluminum stearate.

DESCRIPTION OF THE PREFERRED EMBODIMENTS

It has been found that the method disclosed in my above-mentioned co-pending application, particularly with respect to the granulating of polymers which contain halogens, may also be applied for the granulating of other plastic materials and, furthermore, the plastic materials themselves may serve as granulating agents for finely subdivided particles of plastic material, whereby the plastic material of the finely subdivided particles and the plastic material of the granulating agent may be the same or different and, if the same, may be of the same or, preferably, different molecular weight, namely so that the molecular weight or degree of polymerization of the plastic material of the granulating agent is lower than that of the finely subdivided solid particles.

Plastics or plastics mixtures which may be granulated in accordance with the present invention and at the same time serve as granulating agents include: polyacrylic acids, polymethacrylates and copolymers thereof, polyvinyls, such as polyvinyl halides, polyvinyl acetates or copolymers thereof, polyolefins, such as polyethylene, polypropylene, or polybutylene, cellulose derivatives, polystyrene, polyesters, polyamides, or polycarbonates. In addition to these thermoplastic materials, certain thermosetting plastics are also suitable, such as phenol or cresol resins or epoxy resins. Elastomers, such as unvulcanized natural rubber or synthetic rubber types such as ABS (acrylonitrile, butadiene, styrene) or ABR (acryl-butadiene-rubber) or chloroprene, as well as polysiloxanes, polyurethane, or polyethers, etc., are also suitable.

For the purpose of carrying out the method according to the present invention in the case of plasticized plastics, the procedure as described in my above-noted co-pending application with respect to granulating halogenated polymers may be followed, namely so that part of the polymers is dissolved at elevated temperature in plasticizers and/or solvents, the remainder of the polymers is suspended in water at elevated temperature, and the solution of the polymers is then stirred into the aqueous suspension and the mixture is slowly heated until granulation has occurred.

1–10%, preferably 5–7% of the total amount of polymers are previously dissolved in the plasticizer and/or solvent.

All plastics, i.e. polymeric materials, which are soluble or at least gellable in the plasticizer and/or solvent are therefore suitable for the method of the present invention. In the case of plasticized plastics it is therefore possible for the granulation to be effected with the plastic of the solid particles also used as granulating agent, a form of a "self-granulation," or else to work with another plastic, which is soluble or gellable in the plasticizer, as the granulating agent.

Other substances which are gellable in the plasticizer and/or solvent may also be used as granulating agents. Thus, for example, lithium stearate in dioctyl phthalate or calcium stearate and/or barium stearate or aluminum stearate or lithium stearate in mineral oil may be used for this purpose.

The better the solubility of the plastic material in the plasticizer or solvent, the more easily the granulation will proceed.

If desired, additives, such as stabilizers or lubricants, may also be granulated together with the principal polymer. The method of the present invention thus makes it possible to place at the disposal of the processor free flowing granules of optimum composition, for the respective processing conditions, in the form of a composition including all additives, such as plasticizers, stabilizers, fillers, antistatic agents, antiflame agents, coloring agents, etc.

The following examples are given as illustrative only, without limiting the invention to the specific details of the examples.

Example I 40 liters of water are brought to a temperature of at least 80° C. with rapid stirring and then 12.5 kg.. of suspension polyvinyl chloride having a K-value of 70, 3 kg. of surface activated chalk, and 40 grams of dibasic lead sulphate are successively stirred in to form a homogeneous dispersion. Independently thereof, 400 grams of suspension polyvinyl chloride of a K-value of 70, 50 grams of suspension polyvinyl chloride of a K-value below 70, and 50 grams of low molecular polyethylene (type: A-wax, manufactured by Badische Anilinund Sodafabrik), and 140 grams of dibasic lead stearate are dissolved in a mixture of 4 kg. of dioctyl phthalate, 1 kg. of dinonyl phthalate, and 2 kg. of chlorinated paraffin (about 40% of chlorine) with heating to a temperature above 100° C. This solution is then stirred vigorously into the aqueous suspension. After stirring the thus-formed mixture slowly for from 1 to 2 minutes at a temperature of at least 80° C., granulation will commence. Stirring is continued until the granules have solidified, whereupon they are sifted off and dried.

The resulting granular mass may be used for making cables.

It is occasionally advantageous for the self-granulation to be carried out with the same plastics material, i.e. a polymer formed of the same monomer, but of lower molecular weight, since plastics of lower molecular weight are more easily soluble in plasticizers or solvents than the same plastics having a higher molecular weight. Not only does the granulation then proceed more easily, but other technical advantages may also be achieved. If, for example, a polyvinyl chloride of a lower K-value is used as granulating agent for granulating polyvinyl chloride having a higher K value, the cold impact strength will be improved thereby. In the case of polyvinyl chloride, for example, it is also possible to work with superchlorinated polyvinyl chloride as granulating agent, since the latter is also more readily soluble in solvents or plasticizers than normally chlorinated polyvinyl chloride.

In the case of non-plasticized plastics, the granulating agents are "dissolved" in suitable solvents in which the plastics used as granulating agents are soluble or at least swellable. The solvents used are mainly those having boiling points of up to 135° C., but preferably below 100° C., or those which are volatile with water vapor, i.e. which are steam distillable.

The use of solvents for previously dissolving the plastics used as granulating agents is however not always advantageous in the case of the granulation of plastics or plastics mixtures which do not contain plasticizer, particularly when the plastic material can be partly gelatinized by the solvent and the latter is then removable from the granules only with difficulties or not at all, apart from the costs resulting from the labor and energy spent for evaporating the solvents.

For the granulation of plastics which are free of plasticizer it is therefore advantageous to proceed by diluting a suspension or emulsion of the polymerized resins with water, then heating, preferably to a temperature above 80° C., adding the granulating agent in the form of a melt to this dilution and then stirring until a granulate is formed, which is then sifted off and dried. For this purpose, preferably, use is made of plastics having lower melting points, or of plastics which soften below the boiling point of water and may thus be used as granulating agents, that is to say in particular of low molecular-weight plastics, such as for example low molecular polyethylenes of polyethylene glycols.

If the granulation is to be carried out under pressure and the boiling point of water is thus raised, it is also possible to use as granulating agents plastics which soften at correspondingly higher temperatures.

Plastics may also be used in general as granulating aids for granulating polymers together with other substances such as pigments, fillers, stabilizers, lubricants, rubber additives, and last but not least paper making aids. Composite processing aids for plastics, consisting for example of stabilizers, fillers, lubricants, antistatic agents, coloring agents, and so on, in an adjusted proportion, also may be advantageously granulated according to the present invention utilizing plastic materials, i.e. high polymeric materials, as granulating agents. For this purpose, use is preferably made of those plastic materials for which the individual constituents of the composite processing aids are provided. In such case the plastic may be added in the form of an emulsion, dispersion, or suspension to the material which is to be granulated. Plastics having a correspondingly low softening point may again be added in the form of a melt. Stabilizer-lubricant-filler compounds may occasionally also contain plastics and/or plasticizers, whereby they can be more easily uniformly distributed. In such cases it is possible to proceed by separately dissolving the plastic in the plasticizer and adding the thus-obtained hot solution to the aqueous suspension of the substances which are to be granulated, while stirring.

Example II 10 kg. of polystyrene are suspended in 50 liters of water and heated to 80° C. with vigorous stirring. Independently thereof 500 grams of stabilized monostyrene are dissolved in 2 liters of ethyl benzene. This solution is added to the suspension previously prepared and stirring of the mixture continued until granules of the polystyrene have formed.

Example III 10 kg. of high molecular polyethylene (polymerization degree 250,000) are suspended in 50 liters of water and heated to 80° C. with stirring. To this suspension there is added a separately prepared solution of 400 grams of low molecular polyethylene (polymerization degree 10,000) and 100 grams of polyvinyl chloride (K-value 55) in 3 kg. of benzene, 1 kg. of ethyl acetate, and 1 kg. of toluene. Stirring of the mixture is continued until solid polyethylene granules have formed.

Example IV 10 kg. of phenolic resin are suspended in 40 liters of water and heated to 80° C. while stirring rapidly. A 60% phenolic resin solution in alcohol is separately prepared. 2 kg. of this solution are added with vigorous stirring to the suspension first prepared. Stirring of the mixture is continued for 5 minutes until the desired phenolic resin granules have formed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of preparing agglomerates of finely subdivided synthetic polymer particles, comprising:
    (a) preparing a heated aqueous homogeneous suspension of said polymer particles by vigorously stirring a mixture of said polymer and water at a temperature of at least 80° C., said particles being of a type which is at most slightly soluble in water, and to which water is inert;
    (b) preparing at a temperature of at least 80° C. a granulating solution for said suspension by dissolving within a liquid organic solvent a granulating agent consisting of a synthetic organic plastic polymer;
    (c) adding said granulating solution to said aqueous suspension with continuous and vigorous stirring at an elevated temperature below 100° C. and sufficiently high to form agglomerates of said subdivided particles adhered to each other by said granulating agent; and
    (d) separating said formed agglomerates from the liquid mass.

2. A method as defined in claim 1, wherein said liquid organic solvent has a boiling point below 135° C.

3. A method as defined in claim 1, wherein said liquid organic solvent has a boiling point below 100° C.

4. A method as defined in claim 1, wherein said liquid organic solvent is steam distillable.

5. A method as defined in claim 1, wherein the softening point of said subdivided particles is above the boiling point of said liquid organic solvent.

6. A method as defined n claim 1, wherein said subdivided particles consist essentially of a plastic material and the plastic material of said subdivided particles and of said granulating agent each is selected from the group consisting of polycarboxylic acids, polymethacrylate and copolymers thereof, vinyl polymers and copolymers thereof and polyolefins.

7. A method as defined in claim 6, wherein said vinyl polymers are selected from the group consisting of polyvinyl halides, polyvinyl acetates and copolymers thereof.

8. A method as defined in claim 1, wherein said finely subdivided particles and said granulating agent consist essentially of polymers formed of the same monomer, said granulating agent having a lower molecular weight than said subdivided particles.

9. A method as defined in claim 1, wherein said finely subdivided particles consist essentially of a polyvinyl halide, and said granulating agent is selected from the group consisting of polyvinyl halides of lower K-value than that of said particles, and superchlorinated polyvinyl halides.

10. A method as defined in claim 1, wherein said aqueous suspension is at a temperature above 80° C., and said granulating agent consisting of a plastic material having a softening point below 100° C.

11. A method as defined in claim 1, wherein said granulating solution is stirred into said heated suspension while the latter is maintained at superatmospheric pressure, and said granulating agent has a softening point below the boiling point of water at said superatmospheric pressure.

12. A method as defined in claim 6, wherein said polyolefins are selected from the group consisting of polyethylene, polypropylene and polybutylene.

13. A method as defined in claim 1, wherein said finely subdivided solid particles are granulated together with additives comprising a plasticizer, filler, lubricant, antistatic agent, anti-flame agent, or coloring agent.

References Cited

UNITED STATES PATENTS

| | | | |
|---|---|---|---|
| 2,361,283 | 10/1944 | Good | 210—49 |
| 3,321,426 | 5/1967 | Dorsey | 260—28.5 |

ROBERT F. WHITE, Primary Examiner

J. R. HALL, Assistant Examiner

U.S. Cl. X.R.

260—34.2